No. 687,373. Patented Nov. 26, 1901.
C. P. GOERZ.
FOCAL ADJUSTMENT FOR BINOCULAR OPTICAL INSTRUMENTS.
(Application filed Mar. 16, 1900.)
(No Model.)

Witnesses:
Richard Scherpe
Curt Gesell

Inventor:
Carl Paul Goerz.
by
Attorney.

UNITED STATES PATENT OFFICE.

CARL PAUL GOERZ, OF BERLIN, GERMANY.

FOCAL ADJUSTMENT FOR BINOCULAR OPTICAL INSTRUMENTS.

SPECIFICATION forming part of Letters Patent No. 687,373, dated November 26, 1901.

Application filed March 16, 1900. Serial No. 8,899. (No model.)

*To all whom it may concern:*

Be it known that I, CARL PAUL GOERZ, a citizen of the Kingdom of Prussia, and a resident of Berlin-Friedenau, Germany, (whose post-office address is Rheinstrasse 45/46, Berlin-Friedenau,) have invented certain new and useful Improvements in Focal Adjustments for Binocular Optical Instruments, of which the following is a specification.

The object of the present invention is an improved focal adjustment for binocular optical instruments of that class in which the distance of the lens-tubes is variable. This new adjustment serves for simultaneously adjusting the lens-tubes in their axial direction.

In the annexed drawings the adjusting device is represented as adapted to a binocular prism-telescope.

Figure 1:
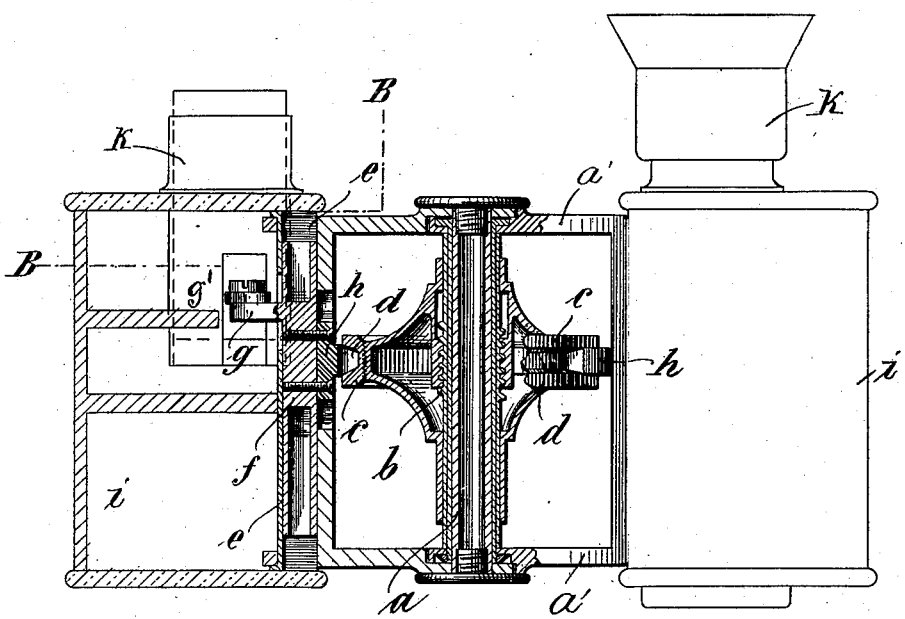
Figure 2:
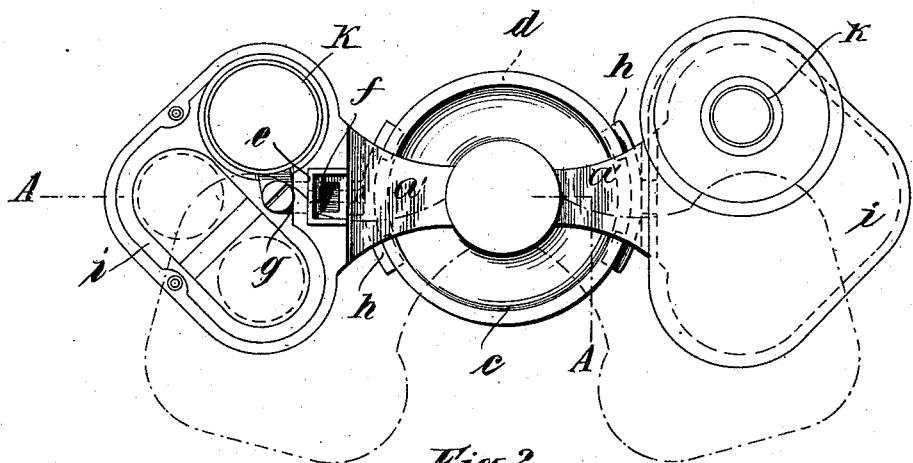

Figure 1 is an elevation, partly in section, on the line A A of Fig. 2; and Fig. 2 is a plan view, partly in section, on line B B of Fig. 1.

The prism-telescope consists in two tubes $i$, each containing an objective and a set of prisms. These being of known construction, they are not peculiarly shown in the drawings. Within the tubes $i$ slide the short tubes $k$, containing the oculars. The tubes $i$ are connected by means of short arms $a'$, hinged together.

$a$ is a stationary spindle serving as a pivot for the two parts forming the bridge $a'$, which connects the two body parts of the instrument, said spindle being provided at or about its center with a screw-thread $b$. To facilitate the manufacture of the instrument, the said spindle $a$ is composed of several cylinders or tubes fitting one into the other. The nut for which the thread $b$ is provided has the form of a disk $c$, the edge of which is milled and provided with a groove $d$.

$e$ is a guiding-groove, in the present instance made so that it is recessed in the interior of the instrument and preferably of quadrangular shape. Inside this groove $e$ there slides a guide-bar $f$ of substantially equal diameter, but slightly shorter than said groove $e$. There is a groove $e$ and bar $f$ in each of the two parts of the binocular instrument. Each guide-bar has two projections $g$ and $h$, which pass through suitable apertures in the body of the instrument and the bridge part $a'$. The projection $g$ is suitably connected by aid of a screw with a projection $g'$ on the eye-lens tube in such a manner that the said tube must take part in any movement the guide-bar $f$ and the projection $g$ are caused to make. The end of the projection $h$ is shaped so as to fit into the groove $d$ in the edge of disk $c$. On said disk $c$ being turned it moves upward or downward on the spindle $a$. The projection $h$ must consequently take part in such up-and-down movement, and therefore, also, the guide-bar $f$, the projection $g$, and the eye-tube, which is connected with the latter. If the said eye-lens tube were directly connected with the disk $c$ instead of with the intervening guide-bar $f$, the length of the connecting rod or lever through which the movement was transmitted would cause the eye-lens tube to jam or stick in its bearing-tube. By providing the said guide-bar the distribution of the leverage is rendered more favorable, as the length of the transmitting-levers is considerably reduced, and in consequence of the support given by the guide-bar $f$, sliding in the slot $e$, no jamming of the said lens can take place. The end of the projection $h$ not being firmly fixed to the disk $c$, but only fitting into the groove $d$ in the edge thereof, angular adjustment can be made to suit the instrument to the sight of any person without affecting the focal adjusting device in any way.

What I claim is—

In a focal adjusting device for binocular instruments, the combination with a disk, adapted to move longitudinally and having a circumferential groove, of a casing carrying the ocular tube and having a groove, a guide-bar sliding in said groove, said bar having lateral pins engaging the ocular tube, and the circumferential groove of the disk, respectively, substantially as described.

In testimony whereof I affix my signature in presence of two witnesses.

CARL PAUL GOERZ.

Witnesses:
 WOLDEMAR HAUPT,
 HENRY HASPER.